United States Patent [19]

Canavespe

[11] Patent Number: 5,108,043
[45] Date of Patent: Apr. 28, 1992

[54] TWIN ENGINE HELICOPTER ACCESSSORY DRIVE

[75] Inventor: Joseph A. Canavespe, Fort Worth, Tex.

[73] Assignee: Bell Helicopter Textron, Inc., Ft. Worth, Tex.

[21] Appl. No.: 677,162

[22] Filed: Mar. 29, 1991

[51] Int. Cl.$^5$ .......................................... B64C 27/14
[52] U.S. Cl. .................... 244/17.11; 244/60; 74/661; 74/665 B; 74/665 L; 192/47; 192/48.92; 416/170 R; 416/169 R
[58] Field of Search ................. 244/17.11, 60; 74/661, 74/665 B, 665 L; 192/41 R, 42, 47 X, 48.6, 48.8, 48.92; 416/170, 169 R; 60/39.141

[56] References Cited

U.S. PATENT DOCUMENTS

| | | |
|---|---|---|
| 3,196,612 | 7/1965 | Laville et al. .......................... 244/60 |
| 3,255,825 | 6/1966 | Moville et al. ................... 74/665 L |
| 3,290,963 | 12/1966 | Oldfield et al. ..................... 74/665 B |
| 3,362,255 | 1/1968 | DeRocca et al. ................... 74/665 L |
| 4,915,200 | 4/1990 | Jacques et al. .......................... 244/60 |

FOREIGN PATENT DOCUMENTS 832657  4/1960  United Kingdom ................. 244/60
2158895 11/1985 United Kingdom ................. 244/60

Primary Examiner—Galen Barefoot
Attorney, Agent, or Firm—James E. Bradley

[57] ABSTRACT

A twin engine helicopter has an accessory drive system that will operate with only one engine while the other engine is off. The system also allows starting of the second engine without turning the first engine off. An input clutch for the first engine will rotate an inner drive member when it is being driven by the first engine. An accessory drive member mounts to the inner drive member. A collector gear mounts in engagement with the blade drive train and has a drive member. A movable clutch shaft has one end that engages the inner drive member of the input clutch and another end which will engage the drive member of the collector gear. An actuator will move the clutch shaft out of engagement with the drive member of the collector gear to disengage the drive engine from the blade drive train. A synchronizing clutch mounts in engagement with the clutch shaft for causing the clutch shaft to rotate with the collector gear if the second engine is started and operated at a speed faster than the first engine.

12 Claims, 3 Drawing Sheets

TWIN ENGINE HELICOPTER ACCESSSORY DRIVE

BACKGROUND OF THE INVENTION

1. Field of the invention

This invention relates in general to helicopter drive trains, and in particular to a means for disengaging one engine in a twin engine helicopter from the blade drive train so that it will drive accessories while the other engine is off.

2. Description of the Prior Art

In a twin engine helicopter, both engines connect to a blade drive train for driving the blades and the tail rotor. An accessory gear will be connected into the drive system at one point for driving accessories such as hydraulic pumps, air conditioner pumps, generators and the like. During normal flight, the accessory gear will be rotating along with the blade and tail rotor.

There are times when for reasons such as maintenance, an operator would want to run the accessories with one engine without rotating the blade or tail rotor. In one prior art type, this is handled by a disengaging mechanism which disengages one engine from the blade drive train. This disengaging system requires that both engines be turned off before reengaging the engines with the blade drive train.

Consequently, after operating one engine to run the accessories, the operator would have to turn that engine off, then restart both engines with the blade train engaged. As the engines are normally started with battery power, this can be a problem. Considerable energy is required to start an engine from the battery. It may be difficult at times to restart the engines.

In another prior art type, the blade train can be reengaged while one of the engines is running. As far as is known, this system removes an inner race from one of the input overrunning clutches during disengagement, and re-inserts the inner race to reengage. The input overrunning clutches are safety clutches that enable a helicopter to land with blade rotation in the event of engine failure. The input clutches will also allow one engine to drive the helicopter blade without the other engine. While workable, problems may occur as a result of removal and insertion of an inner race of an overrunning clutch.

SUMMARY OF THE INVENTION

In this invention, an accessory drive gear is mounted to the inner drive member of the overrunning clutch of one of the engines. An axially movable clutch shaft extends from the inner drive member of that overrunning clutch into a drive member of a collector gear. The collector gear is in engagement with a blade drive train for rotating the blades.

A linear actuator will move the clutch shaft between an engaged position and a disengaged position. In the engaged position, the clutch shaft engages the drive member of the overrunning clutch with the drive member of the collector gear. In the disengaged position, the clutch shaft moves to disengage itself from one of the drive members. As a result, on that side, the engine will not rotate the collector gear and thus the blade gear train will not be rotated if the other engine is off. The accessory gear continues to rotate, however, because it is connected to the inner drive member of the overrunning clutch.

The linear actuator can re-engage the engine with the blade drive train while the first engine continues to rotate and after the second engine is started. This is handled by using a synchronizing clutch, which is also an overrunning clutch. The synchronizing clutch mounts in the drive member that is disengaged when the clutch shaft is in the disengaged position. The synchronizing clutch has an inner drive member that remains in engagement with the movable clutch shaft. While in the disengaged position, the synchronizing clutch will freewheel, allowing the movable clutch to rotate with the first engine, but not moving the collector gear.

Starting the second engine and bringing it up to a speed higher than the rotation of the first engine will cause the synchronizing clutch to begin driving the movable clutch shaft. The drive member of the collector gear and the inner drive member of the input clutch will thus be rotating at the same speed. The operator may then energize the linear actuator to cause the movable clutch shaft to move back into engagement with both drive members.

DETAILED DESCRIPTION OF THE INVENTION

Figure 1:
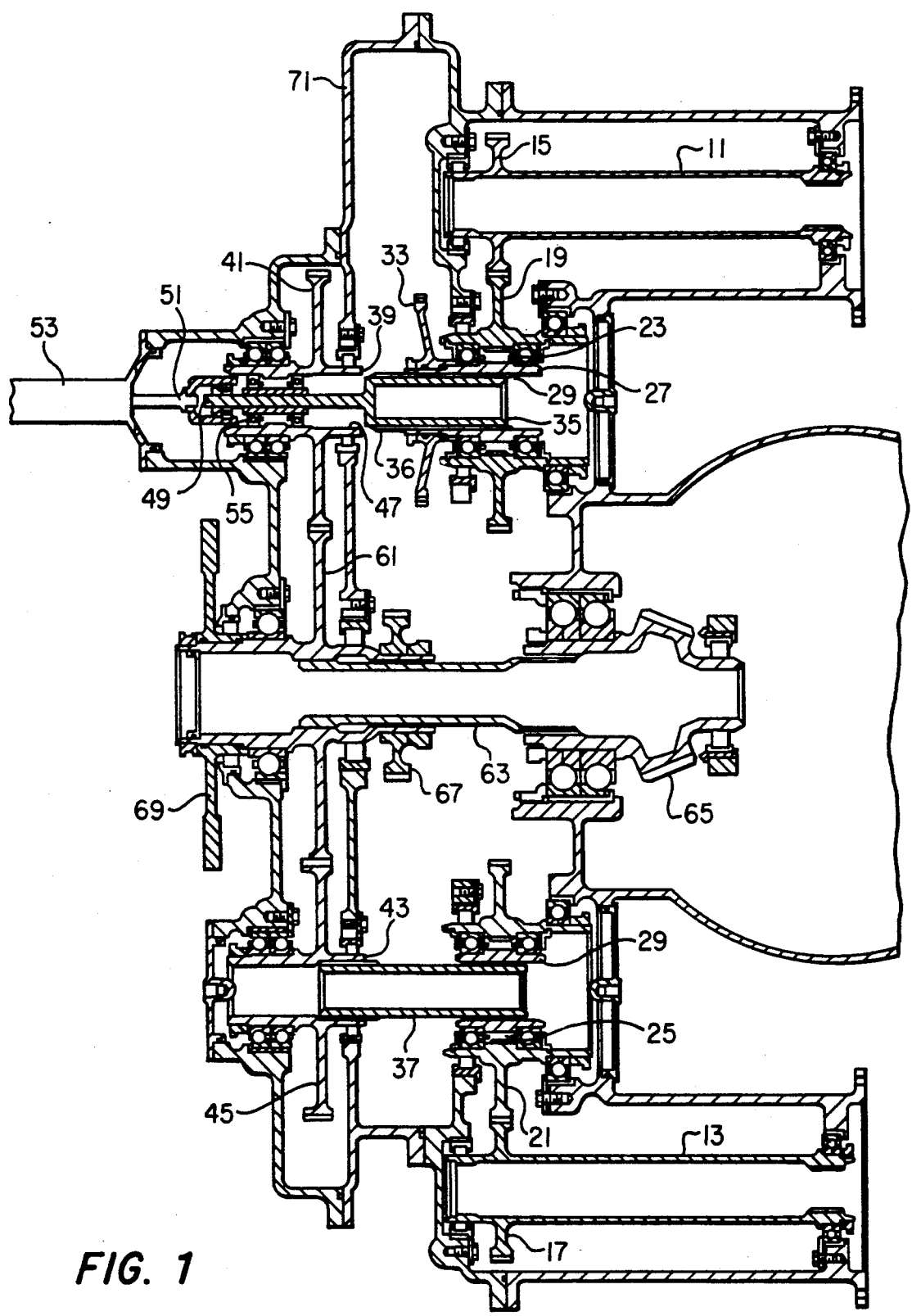
FIG. 1 is a sectional view illustrating portions of a drive train for a twin engine helicopter, and showing a movable clutch shaft in a disengaged position.

Referring to FIG. 1, the drive train system includes a right engine input shaft 11 and a left engine input shaft 13. The input shafts 11, 13 will be connected to a right and left engine, respectively (not shown). The input shafts 11, 13 are hollow members, each having a splined area for receiving a drive shaft of an engine. The right input gear 15 rotates with input shaft 11. A left input gear 17 rotates with left input shaft 13. Right input gear 15 engages and rotates an outer member 19 of a right input clutch 23. Similarly, left input gear 17 engages and rotates an outer member 21 of a left input clutch 25.

Input clutches 23, 25 are conventional overrunning clutches. Right input clutch 23 has an inner race or inner drive member 27. Left input clutch 25 has an inner race or inner drive member 29. Driving the outer member 19, 21 will rotate the inner member 27, 29. However, driving the inner member 27, 29 will not cause the outer member 19, 21 to rotate. Rather, the inner member 27, 29 would freewheel.

Each inner drive member 27, 29 has splines or teeth 31 within its bore. An accessory drive gear 33 is secured to one of the inner drive members 27, 29. In the embodiment shown, the accessory drive gear 33 is mounted to the right inner drive member 27. Accessory drive gear 33 will drive conventional accessory equipment such as hydraulic pumps, generators, air conditioner compressors and the like. The accessory equipment will be driven only through the single accessory gear 33.

A movable clutch shaft 35 having splines 36 will engage the drive teeth 31 of the right input clutch inner drive member 27. Clutch shaft 35 will slide along its axis between the disengaged position shown in FIGS. 1 and 3, and an engaged position shown in FIG. 2. A fixed clutch shaft 37 also has splines 36 for engaging the drive teeth 31 of the inner drive member 29 of the left input clutch 25. Fixed clutch shaft 37 is axially stationary.

Splines 36 on movable clutch shaft 35 will engage a drive member 39. Drive member 39 is an integral hub portion of a collector gear 41. Movable clutch shaft 35 will slide into and out of engagement with drive member 39, as can be seen by comparing FIGS. 1 and 3 with FIG. 2. The fixed clutch shaft 37 will remain in engagement with a drive member 43 of a left collector gear 45. Each of the drive members 39, 43 has internal teeth or splines 47 which mesh with the splines 36 of the clutch shafts 35, 37, respectively.

Figure 2:
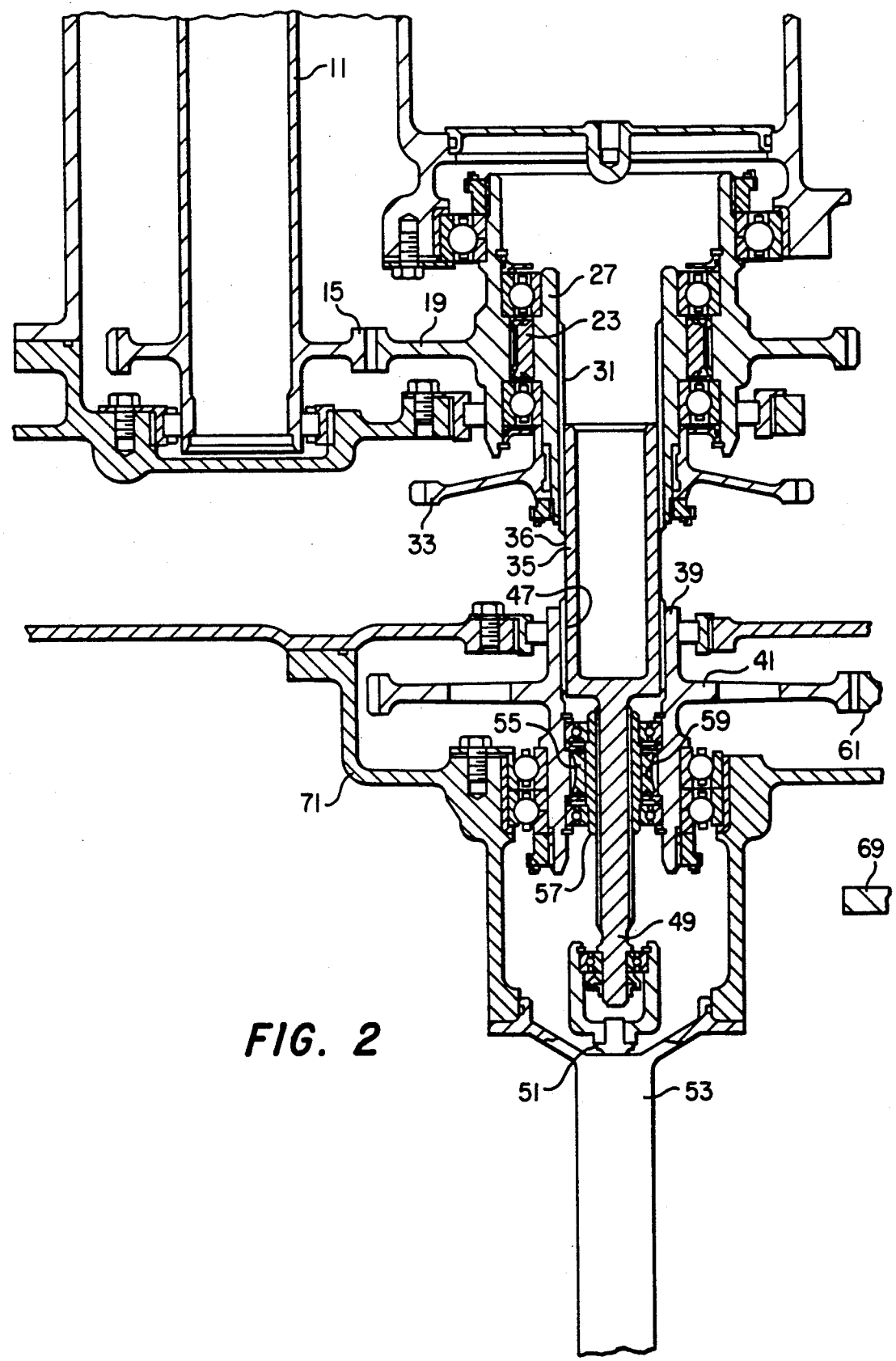
FIG. 2 is an enlarged sectional view of right engine portions of the drive train shown in FIG. 1, and showing the movable clutch shaft in an engaged position.
Figure 3:
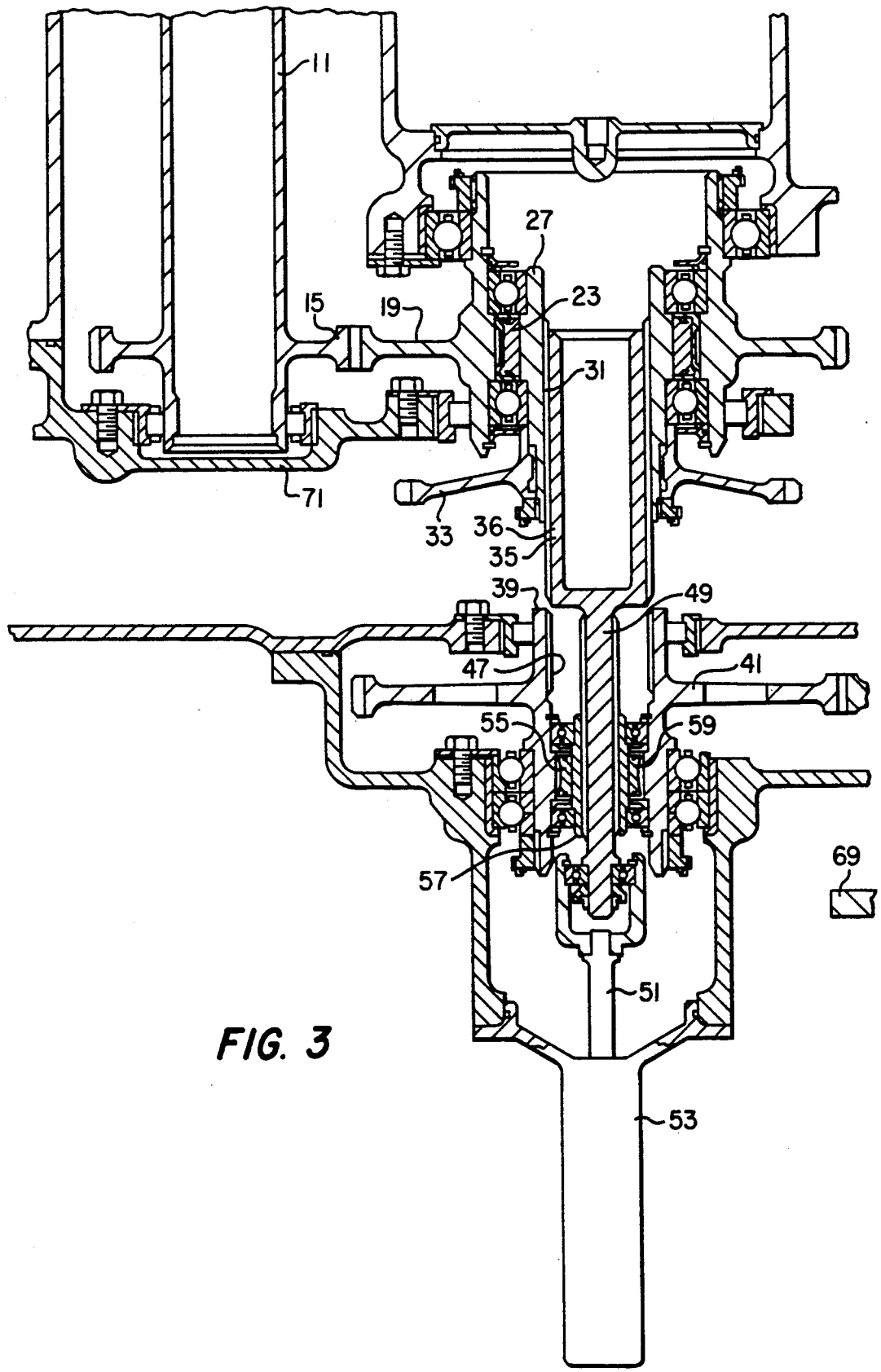
FIG. 3 is a sectional view similar to FIG. 2, but showing the movable clutch in a disengaged position.

Movable clutch shaft 35 has a linkage rod 49 extending forward and through the drive member 39. Linkage rod 49 is splined also but of considerably smaller diameter than the portion containing splines 36. Linkage rod 49 connects to an actuator rod 51 by a yoke. Actuator rod 51 is part of and is moved axially by linear actuator 53. Linear actuator 53 will move the movable clutch shaft 35 from the disengaged position shown in FIGS. 1 and 3 to the engaged position shown in FIG. 2. While in the disengaged position as shown in FIGS. 1 and 3, right engine rotation will rotate the movable clutch shaft 35 and the accessory gear 33, but will not drive the right collector gear 41.

The movable clutch linkage rod 49 extends into a synchronizing clutch 55. Synchronizing clutch 55 is located within the right collector gear drive member 39. As shown in FIG. 2, synchronizing clutch 55 has an inner race member 57 and an outer race member 59. Synchronizing clutch 55 is also of an overrunning type and operates in the same manner as the input clutches 19, 21. When the movable clutch shaft 35 is being driven by the right engine input shaft 11, the inner member 57 will freewheel. It will not cause rotation of the outer member 59. However, if the outer race member 59 is rotated by rotation of the collector gear 41, it will cause rotation of the inner member 57. Rotation of inner member 57 will drive the movable clutch shaft 35.

The right and left collector gears 41, 45 each connect to opposite sides of a blade drive train input gear 61. Input gear 61 is mounted to a blade drive train shaft 63. Shaft 63 drives a blade drive train output gear 65, which in turn drives the helicopter blades (not shown). Tail rotor gear 67 also mounts to blade drive train shaft 63. The rotor 69 of a brake for applying braking force to the blade drive train shaft 63 is conventional. The blade drive train, including the members 61, 63, 65 and 67 are also conventional.

The components described above are enclosed within a housing 71 made up of a number of different components. The components described above and located within housing 71 are mounted on suitable bearings, which are shown but are not discussed because of their conventional nature.

In operation, during a normal flight mode, with the blade and tail rotor rotating, the movable clutch shaft 35 will be in the engaged position shown in FIG. 2. Power from the right engine will rotate the right input shaft 11. Input shaft 11 in turn rotates the right input gear 15, which in turn rotates the outer member 19 of the right input clutch 23. Rotation of the outer member 19 rotates the inner drive member 27, which in turn rotates the movable clutch shaft 35. Movable clutch shaft 35 rotates the right collector gear 41, which in turn provides rotary power to the blade drive train input gear 61. The accessory gear 33 is rotated by the inner drive member 27 of the right input clutch 23. Accessory gear 33 rotates the drive system to power the accessories.

Similarly, the left engine input shaft 13 will drive the outer member of the left input clutch 25. The outer member 21 drives the fixed clutch shaft 37, which in turn drives the left collector gear 45. The left collector gear 45 applies rotary power to the blade drive input gear 61.

Assuming both engines are off, and the operator wishes to operate the accessories without blade rotation, he would then actuate the linear actuator 53. This moves the movable clutch shaft 35 to the disengaged position shown in FIGS. 1 and 3. The right engine may then be started and brought on line. The right engine input shaft 11 will rotate the outer member 19 of the right input clutch 23. The right input clutch 23 will cause the inner drive member 27 to rotate the accessory gear 33 to drive the accessories.

The inner drive member 27 will also rotate the movable clutch shaft 35. The linkage rod 49 will cause rotation of the inner member 57 (FIG. 2) of the synchronizing clutch 55. Synchronizing clutch 55 will not transmit the drive on the inner member 57 to the outer member 59. Consequently, collector gear 41 will not rotate. If the left engine is not operating, the blade drive train input gear 61 will not rotate and the blade will not rotate.

When it is desired to bring the left engine on line, it is not necessary to stop the right engine. The rotor brake 69 can be applied if desired to hold the blade shaft 63 stationary during starting of the left engine. However, if there is no problem with the blade rotating during starting of the left engine, the rotor brake 69 need not be applied. The left engine can be started using the power from the generators (not shown) being driven by the right engine, which continues to operate.

When the left engine is started, it will rotate the left engine input shaft 13 if the brake 69 is released. The brake 69 must be released in order to engage movable clutch shaft 35 with the collector gear drive member 39. Once brake 69 is released, the left input shaft 13 will rotate the blade drive train input gear 61. This rotation occurs through rotation of the outer member 21 of the left input clutch 25. The left input clutch 25 drives the fixed clutch shaft 37, which in turn drives the left collector gear 45. The left collector gear 45 will drive the blade drive train input gear 61.

This rotation of the blade drive train input gear 61 also causes rotation of the right collector gear 41. Initially, the accessory drive gear 33 will continue to be driven by the right engine. The operator will bring the rotational speed of the left engine to a point higher than the rotational speed of the right engine. Once this occurs, the outer member 59 of synchronizing clutch 55 will start to drive the inner member 57. The inner member 57 will begin to rotate in unison with the speed of the right collector gear 41. This rotation drives the movable clutch shaft 35, which in turn drives the inner drive member 27 of the right input clutch 23. The accessory gear 33 will now be powered by the left engine. The right input clutch 23 will be overrunning because the rotation of the inner drive member 27 will not cause rotation of the outer member 19.

At that point, the movable clutch shaft 35 will be rotating at exactly the same speed as the drive member 39 of the right collector gear 41. The splines 36 will be synchronized in speed with the splines 47. The operator may then actuate the linear actuator 53 to move the movable clutch shaft 35 back to the engaged position shown in FIG. 2. The ends of the splines 36 are chamfered to facilitate engagement with the teeth 47. If the splines 36, 47 abutted, the flight control system provides a slight jog of the speed of the left engine to permit positive engagement. Once engaged, both input shafts 11, 13 would be applying power from their respective engines to the blade drive input gear 61.

The invention has significant advantages. The accessory drive system allows accessories to be powered by one engine of a twin engine helicopter with the other engine off. The accessory drive system also allows the other engine to be started and brought on line without turning the first engine off. The accessory drive system permits engaging and disengaging of the blade drive train without compromising the integrity of the main clutch.

While the invention has been shown in only one of its forms, it should be apparent to those skilled in the art that it is not so limited, but is susceptible to various changes without departing from the scope of the invention. For example, the linear actuator for the movable clutch could be inverted. In that case, the synchronizing clutch would be mounted within the drive member of the right input clutch, rather than in the drive member of the right collector gear. Also, in that case, the movable clutch would engage and disengage itself from the inner drive member of the right input clutch, and remain in engagement with the drive member of the right collector gear.

I claim:

1. In a twin engine helicopter having first and second engines, the second engine being coupled to a blade drive train for rotating a blade, an improved means for driving accessories with the first engine without rotation of the blade and with the second engine off, comprising in combination:

an input gear mounted for rotation with the first engine;

input clutch means for rotating a drive member when the input gear is being driven by the first engine and for allowing the drive member to freewheel if the drive member is rotated relative to the input gear;

an accessory drive gear driven by the drive member of the input clutch means for powering the accessories;

a collector gear in engagement with the blade drive train, the collector gear having a drive member;

an axially movable clutch shaft;

actuator means for selectively moving the clutch shaft axially between an engaged position coupling the drive member of the collector gear with the drive member of the input clutch means to transmit power from the first engine to the blade drive train, and a disengaged position with the clutch shaft out of driving engagement with one of the drive members to decouple the first engine from the blade drive train to allow the first engine to drive the accessories without blade rotation and with the second engine off, the clutch shaft remaining in driving engagement with the other of the drive members during the disengaged position; and synchronizing clutch means mounted in engagement with the clutch shaft and the drive member that is disengaged during said disengaged position, for driving the clutch shaft with the collector gear if the second engine is started and operated at a speed faster than the first engine while the clutch shaft is in the disengaged position, thereby driving the accessories with the second engine and allowing the actuator means to shift the clutch shaft back to the engaged position.

2. The helicopter according to claim 1 wherein the synchronizing clutch means allows the clutch shaft to rotate relative to the drive member that is disengaged during said disengaged position while the first engine is operating and the second engine off.

3. The helicopter according to claim 1 wherein the actuator means disengages the clutch shaft from the drive member of the collector gear during the disengaged position.

4. The helicopter according to claim 1 wherein each of the drive members contain internal teeth, and wherein the shaft is splined for engaging the teeth.

5. In a twin engine helicopter having first and second engines, the second engine being coupled to a blade drive train for rotating a blade, an improved means for driving accessories with the first engine without rotation of the blade and with the second engine off, comprising in combination:

an input gear mounted for rotation with the first engine;

an overrunning input clutch, having an outer member rotated by the input gear, the input clutch having a drive member containing teeth and which is driven by the outer member when the first engine is driving the input gear, the drive member freewheeling if the drive member is rotated relative to the outer member;

an accessory drive gear driven by the drive member of the input clutch for powering the accessories;

a collector gear in engagement with the blade drive train, the collector gear having a drive member containing teeth;

a splined clutch shaft;

a linear actuator for selectively moving the clutch shaft axially between an engaged position coupling the drive member of the collector gear with the drive member of the input clutch to transmit power from the first engine to the blade drive train, and a disengaged position with the clutch shaft out of driving engagement with one of the drive members to decouple the first engine from the blade drive train to allow the first engine to drive the accessories without blade rotation and with the second engine off, the clutch shaft remaining in driving engagement with the other of the drive members during the disengaged position; and an overrunning synchronizing clutch having an outer member mounted in the drive member that is disengaged from driving engagement with the clutch shaft when the clutch shaft is in the disengaged position, and a splined inner drive member that remains in engagement with the clutch shaft in both said engaged and disengaged positions, the synchronizing clutch allowing the inner drive member to freewheel relative to the outer member of the synchronizing clutch if the clutch shaft is in the disengaged position and the first engine operating, the synchronizing clutch driving the clutch shaft if the second engine is started and operated at a speed faster than the first engine while the clutch shaft is in the disengaged position, thereby driving the accessories with the second engine and allowing the linear actuator to shift the clutch shaft back to the engaged position.

6. The helicopter according to claim 5 wherein the linear actuator disengages the clutch shaft from the drive member of the collector gear when moving the clutch shaft to the disengaged position.

7. The helicopter according to claim 5 wherein the teeth of the drive member of the input clutch and the teeth of the drive member of the collector gear each are located internally within the drive members.

8. A twin engine helicopter having an improved means for driving accessories with a single engine and without rotation of the blade, comprising in combination:

a first input gear rotated by a first engine and a second input gear rotated by a second engine;

overrunning first and second input clutches, each having an outer member rotated by the first and second input gears, respectively, and each driving an inner drive member;

first and second clutch shafts, each having one end engaging the inner drive member of each first and second input clutch, respectively;

first and second collector gears, each having a drive member for engagement by another end of the first and second clutch shafts, respectively;

a blade drive gear train engaging the collector gears for rotating the blade;

an accessory drive gear driven by the inner drive member of the first input clutch for powering the accessories;

a linear actuator for selectively moving the first clutch shaft axially between engaged and disengaged positions into and out of engagement with the drive member of the first collector gear, to decouple the first engine from the blade drive train to allow the first engine to drive accessories without blade rotation and with the second engine off; and an overrunning synchronizing clutch having an outer member mounted in the drive member of the first collector gear and an inner drive member that is engaged by the first clutch shaft in both said engaged and disengaged positions, the synchronizing clutch allowing the inner drive member to freewheel relative to the outer drive member if the first clutch shaft is in the disengaged position and the first engine operating with the second engine off, and the synchronizing clutch driving the first clutch shaft if the second engine is started and operated at a speed faster than the first engine while the first clutch shaft is in the disengaged position, thereby driving the accessories with the second engine and allowing the linear actuator to shift the first clutch shaft back to the engaged position.

9. The helicopter according to claim 8 wherein the drive member of the first collector gear has internal teeth and wherein the first clutch shaft has splines for engaging the internal teeth while in the engaged position.

10. The helicopter according to claim 8 wherein the drive member of the first input clutch has internal teeth and wherein the first clutch shaft has splines for engaging the internal teeth while in the engaged and disengaged positions.

11. The helicopter according to claim 8 wherein the second clutch shaft is axially stationary.

12. The helicopter according to claim 8 wherein the first clutch shaft remains in engagement with the inner drive member of the first input clutch in both the engaged and disengaged positions.

* * * * *